(No Model.)
A. TINDALL.
CULTIVATOR.
No. 480,529. Patented Aug. 9, 1892.
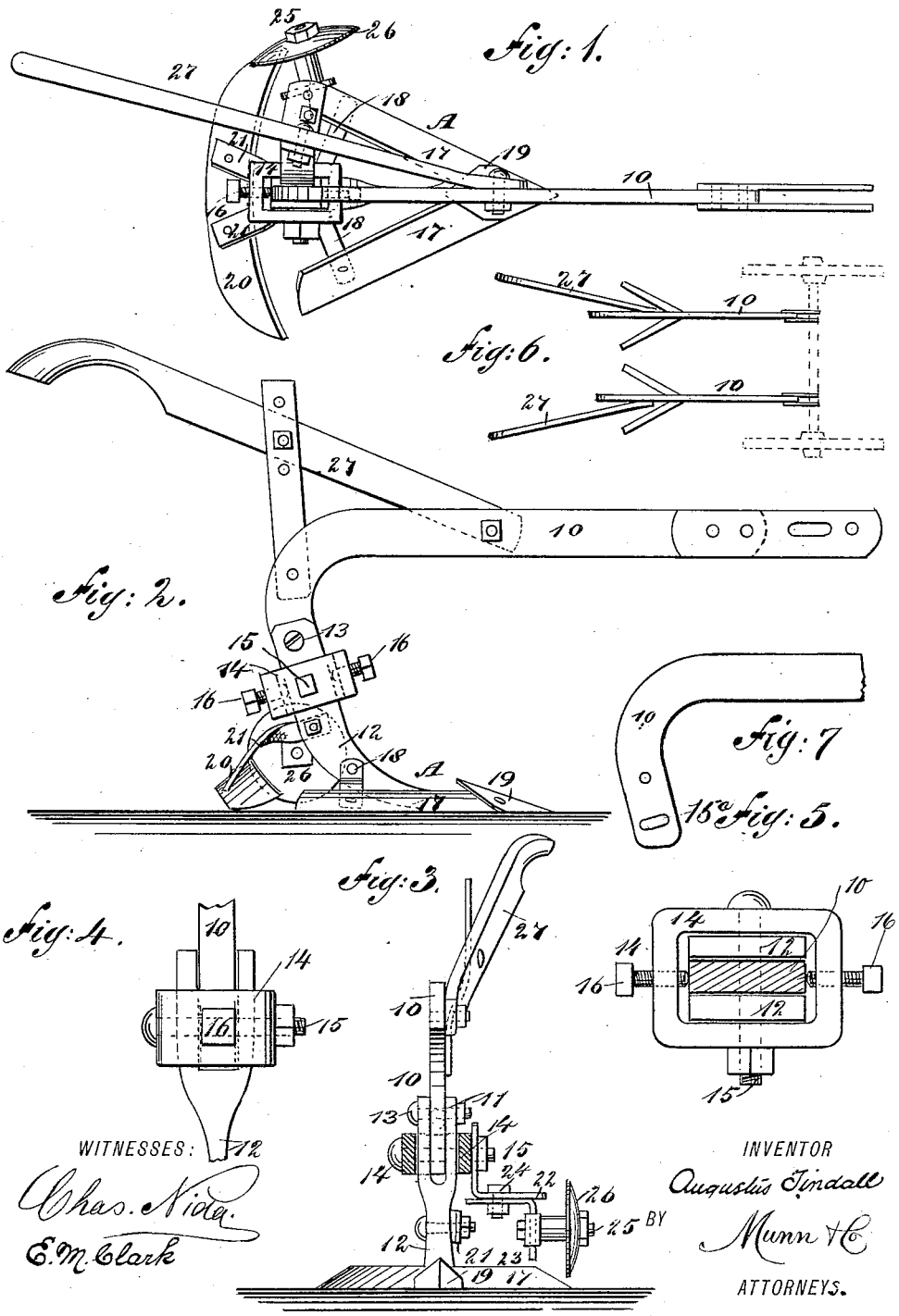
WITNESSES:
Chas. Nida.
E. M. Clark
INVENTOR
Augustus Tindall
BY Munn & Co.
ATTORNEYS.

UNITED STATES PATENT OFFICE.

AUGUSTUS TINDALL, OF BRENTON, ILLINOIS.

CULTIVATOR.

SPECIFICATION forming part of Letters Patent No. 480,529, dated August 9, 1892.

Application filed September 26, 1891. Serial No. 406,914. (No model.)

*To all whom it may concern:*

Be it known that I, AUGUSTUS TINDALL, of the town of Brenton, in the county of Ford and State of Illinois, have invented a new and useful Improvement in Cultivators, of which the following is a full, clear, and exact description.

My invention relates to an improvement in cultivators, and has for its object to produce an implement of simple, durable, and economic construction, and, further, to provide a means whereby the blades may be conveniently and expeditiously raised and lowered.

Another object of the invention is to use in conjunction with the shank of the cultivator-blade a removable and adjustable colter-wheel capable of being placed at any desired inclination with respect to the blade and to so construct the blade that the point will be removable and reversible.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the implement. Fig. 2 is a side elevation of one section thereof. Fig. 3 is a front elevation of a section of the implement. Fig. 4 is a rear elevation of the adjusting-yoke employed for imparting inclination to the cultivator-blade. Fig. 5 is a horizontal section through the beam, the said section being taken immediately above the shank of the cultivator-blade and illustrating the adjusting-yoke in plan view; and Fig. 7 is a side elevation of the rear end of the beam. Fig. 6 is a partial plan view, somewhat diagrammatic, illustrating two members of the cultivator in position for use.

As both members of the cultivator are of like construction, I will confine my description to one of said members, which consists of a beam 10, horizontal for the greater portion of its length and curved downward at its rear end. The beam 10 at its curved lower end enters between the members of the bifurcated upper end 11 of the cultivator-blade shank 12, the lower end of which shank is somewhat flattened and curves downward beneath the beam in the direction of the front end thereof. The connection between the shank and the beam is a pivotal one, being effected through the medium of a bolt 13 or its equivalent, and the adjustment of the shank is effected through the medium of a yoke 14, which yoke surrounds the upper bifurcated portion of the shank below its pivotal connection with the beam, and a bolt 15 is passed through the members of the yoke, through the shank, and through an elongated transverse aperture 15ª in the beam. Thus it will be observed that the shank is capable of a rocking movement—that is, its inner lower end may be canted upward or carried downward—and the yoke 14 is adapted to maintain it in the desired position. This is effected by passing through the front and rear of the yoke a set-screw 16 to a bearing against the beam, as shown in Fig. 5. By screwing in one set-screw and carrying out the other the shank may be canted forward or rearward at will.

The blade A comprises two members 17, connected at their forward ends in a manner to constitute a V. These members are rigidly secured to the forward end of the shank 12, and are also connected at the shank near their rear ends by suitable brace-rods 18. The point 19 of the blade is V-shaped in cross-section and somewhat diamond-shaped in general contour, and by constructing it in this manner should one extremity of the point become dull or blunted the point may be readily reversed and the other extremity made to face forward. The point is attached to the blade by bolts or the equivalent thereof, so that it may be readily removed when desired. At the back of the blade a curved drag 20 is located, the said drag being provided with arms 21, whereby it is pivotally connected with the shank, and the drag may be held in engagement with the ground in any approved manner—as, for instance, by a spring resting at one end upon its rear central surface and having the other end secured to the rear portion of the shank, or the spring may be omitted and the drag will keep in engagement with the ground by gravity.

Upon one member of the adjusting-yoke 14 the vertical member of an angle-bracket 22 is secured, the vertical member extending downward parallel with the shank, and this member may be raised or lowered by producing therein a series of apertures to receive the bolt 15. A second and similar bracket 23 is adjustably attached by a bolt 24 to the horizontal member of the upper bracket, like members of the two brackets engaging, and the vertical member of this lower bracket is provided with a spindle 25, projecting horizontally and outwardly therefrom, which spindle carries a colter-wheel 26, the said wheel being preferably convex upon one side and concave upon the other. The convex side is shown outward; but the concave side may be made to assume that position.

The colter may be adjusted at any angle desired with reference to the shank or to the blade by loosening the screw connecting the two brackets and moving the under bracket in the desired direction, and the colter may be laterally adjusted to and from the heel of the blade by carrying the lower bracket outward or inward upon the upper one.

In Fig. 6 I have shown two of the members in parallel position, connected with a suitable axle supported by the wheels. A handle 27 is attached to the outer side of the beam of each member, and in operation both handles are grasped during the process of cultivating a field.

Having thus described my invention, I claim as new and desire to secure by Letters Patent—

1. In a cultivator, the combination, with a beam provided with an aperture near its lower end and a transverse slot, of a shank to which the cultivator-blade is attached, bifurcated at its upper end to receive the lower portion of the beam, a bolt passed through the upper aperture in the beam and through the shank, pivotally connecting the two, an adjusting-yoke, a bolt passed through the members of the yoke, through the members of the bifurcated end of the shank, and through the slot in the beam, and adjusting-screws located at the front and back portions of the yoke, both engaging with the beam, substantially as described, whereby the lower end of the shank may be raised or lowered, as required.

2. In a cultivator, the combination, with a shank and an essentially-V-shaped cultivator-blade secured thereon, of a reversible point removably connected with the blade and a drag pivoted to the shank at the rear of the blade, as and for the purpose set forth.

3. In a cultivator, the combination, with the beam, the shank of the blade, and a yoke for connecting the shank adjustably to the beam, of an angle-bracket secured to the yoke, a second bracket adjustably secured to the first bracket and provided with a spindle, and a colter-wheel mounted on the said spindle, substantially as described.

4. A cultivator comprising a beam, a shank adjustably secured to the beam, a V-shaped blade on the shank and having reversible point, a drag pivoted to the shank, and a colter-wheel adjustably supported from the shank, substantially as herein shown and described.

AUGUSTUS TINDALL.

Witnesses:
W. T. DURHAM,
JAMES KEWLEY.